(12) United States Patent
Corbin et al.

(10) Patent No.: US 8,601,220 B1
(45) Date of Patent: Dec. 3, 2013

(54) TRANSPARENT DATA MIGRATION IN A STORAGE SYSTEM ENVIRONMENT

(75) Inventors: John R. Corbin, El Paso, TX (US); Vijay Singh, San Jose, CA (US); Saadia Khan, Milpitas, CA (US); Sloan Johnson, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 303 days.

(21) Appl. No.: 13/098,118

(22) Filed: Apr. 29, 2011

(51) Int. Cl.
*G06F 12/00* (2006.01)

(52) U.S. Cl.
USPC .......................................... 711/150; 711/111

(58) Field of Classification Search
None
See application file for complete search history.

(56) References Cited

U.S. PATENT DOCUMENTS

| | | | |
|---|---|---|---|
| 5,513,314 A | 4/1996 | Kandasamy et al. | |
| 6,654,912 B1 | 11/2003 | Viswanathan et al. | |
| 7,010,553 B2 | 3/2006 | Chen et al. | |
| 7,080,221 B1* | 7/2006 | Todd et al. | 711/161 |
| 7,143,307 B1 | 11/2006 | Witte et al. | |
| 7,284,030 B2 | 10/2007 | Ackaouy et al. | |
| 7,313,557 B1* | 12/2007 | Noveck | 1/1 |
| 7,426,617 B2 | 9/2008 | Stager et al. | |
| 7,437,601 B1 | 10/2008 | Manley et al. | |
| 7,464,116 B2 | 12/2008 | Sarma et al. | |
| 7,631,078 B2 | 12/2009 | Ackaouy et al. | |
| 8,055,702 B2 | 11/2011 | Lango et al. | |
| 8,069,149 B1 | 11/2011 | Chen et al. | |
| 8,078,622 B2 | 12/2011 | Rabii et al. | |
| 8,285,817 B1 | 10/2012 | Balasubramanian et al. | |
| 2005/0080824 A1* | 4/2005 | Vaidyanathan et al. | 707/201 |
| 2008/0288670 A1* | 11/2008 | Chambliss et al. | 710/33 |
| 2010/0223429 A1* | 9/2010 | Cher et al. | 711/122 |
| 2011/0225359 A1 | 9/2011 | Kulkarni et al. | |

OTHER PUBLICATIONS

Tanenbaum, Andrew S., *Computer Networks, $3^{rd}$ Edition*, 1996, 521-542, Prentice-Hall, Inc., Upper Saddle River, New Jersey.
Emulex White Paper—Boosting Hadoop Performance with Emulex OneConnect 10GbE Network Adapters, http://www.emulex-dell.com/artifacts/...9f0b.../elx_wp_all_oc_hadoop.pd,f pp. 1-15, 2012.
Fusion-IO White Paper—"Fusion-io: A New Standard for Enterprise-class Reliability" http://www.fusionio.com/white-papers/fusion-io-a-new-standard-for-enterprise-class-reliability/, 3 pages, 2012.

\* cited by examiner

*Primary Examiner* — Alford Kindred
*Assistant Examiner* — Candice Rankin
(74) *Attorney, Agent, or Firm* — Cesari and McKenna, LLP

(57) ABSTRACT

In one embodiment, a data migration technique enables a source storage system to efficiently and reliably migrate data to a destination storage system. The source storage system includes a copy engine that is configured to migrate or copy a set of data, e.g., one or more files, to the destination storage system using a file-based protocol over a network. The copy engine is also configured to ensure that any locks associated with the migrated data set are reclaimed at the destination storage system using a lock-based protocol. The source storage system further includes a proxy service that is configured to translate client requests to access the migrated data set to access requests executable (i.e., discernable) by the destination storage system. The proxy service then forwards or proxies the translated requests over the network to the destination storage system for processing. In essence, the proxy service interacts with the copy engine to proxy protocol specific requests and replies between a client and the destination storage system after copying of the migrated data set has completed, thus rendering data migration transparent to the client.

21 Claims, 6 Drawing Sheets

TRANSPARENT DATA MIGRATION IN A STORAGE SYSTEM ENVIRONMENT

BACKGROUND OF THE INVENTION

1. Field of the Invention

The present invention relates to storage systems and, more specifically, to migration of data in a storage system environment.

2. Background Information

In a dynamic storage environment, a storage administrator may be required to migrate data from a local storage location in, e.g., a source storage system to a new, remote storage location in a destination storage system. The requirement for data migration may arise because a data container, such as a volume, that holds the data becomes full or the source storage system becomes overloaded. The storage administrator may further require a capability to migrate a subset of data in a volume, e.g., a directory or a file, along with any associated locks, without impacting client access to the data during the migration. As used herein, client access to the data includes the ability of a client to modify the data during migration.

A known data migration implementation involves a process that maintains a namespace using symbolic links or by manipulating automount maps to change the storage location of the data. As used herein, a namespace is a client's view of an organization of its data accessible by the client on a storage system, whereas a symbolic link is a data structure that contains a reference to a storage location (or path) of the client's data and an automount map is a data structure used by an automount program that identifies a mount point for that data. For example, the storage administrator may initiate migration to copy the data from the source storage system to the destination storage system in a manner that preserves the namespace, and then updates the symbolic links or automount maps. However, the migration process is not inherently transparent to the client because an application running on the client may need to be interrupted in order to continue using the namespace to direct requests to access that data (e.g., a file) as long that file is open. That is, the application may be stopped or paused to enable closing of the file on the source storage system, updating of the symbolic links or automount maps to reference the new storage location of the file, and then reopening of the file on the destination storage system in order to redirect the client application's requests to the new location. Such interruption is often disruptive to the client.

Another known implementation employs an external storage device or appliance that physically and/or logically interfaces to the source storage system to enable data migration with the destination storage system. The storage appliance receives client requests to access the data during migration and forwards those requests to the source storage system. The implementation allows client access to the data, migration of locks associated with the data and automatic update of symbolic links. However, to provide interoperability between the storage appliance and source storage system, the implementation includes an interface that may introduce an additional point of failure.

SUMMARY OF THE INVENTION

The present invention provides a data migration technique that enables a source storage system to efficiently and reliably migrate data to a destination storage system. According to one or more embodiments described herein, the source storage system includes a copy engine that is configured to migrate or copy a set of data, e.g., one or more files, to the destination storage system using a file-based protocol over a network. The copy engine is also configured to ensure that any locks associated with the migrated data set are reclaimed at the destination storage system using a lock-based protocol. The source storage system further includes a proxy service that is configured to translate client requests to access (modify) the migrated data set to access requests executable (i.e., discernable) by the destination storage system. The proxy service then forwards or proxies the translated requests over the network to the destination storage system for processing. In essence, the proxy service interacts with the copy engine to proxy protocol specific requests and replies between a client and the destination storage system during copying of the migrated data set, thus rendering data migration transparent to the client.

Advantageously, the copy engine and proxy service cooperate to provide an integrated technique for data migration that obviates the need to interface an external appliance to the source storage system, thereby eliminating an additional point of failure. The novel technique also enables migration of data at a sub-volume level, while allowing an application running on a client to modify the data during migration in a manner that is transparent to the client.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1:
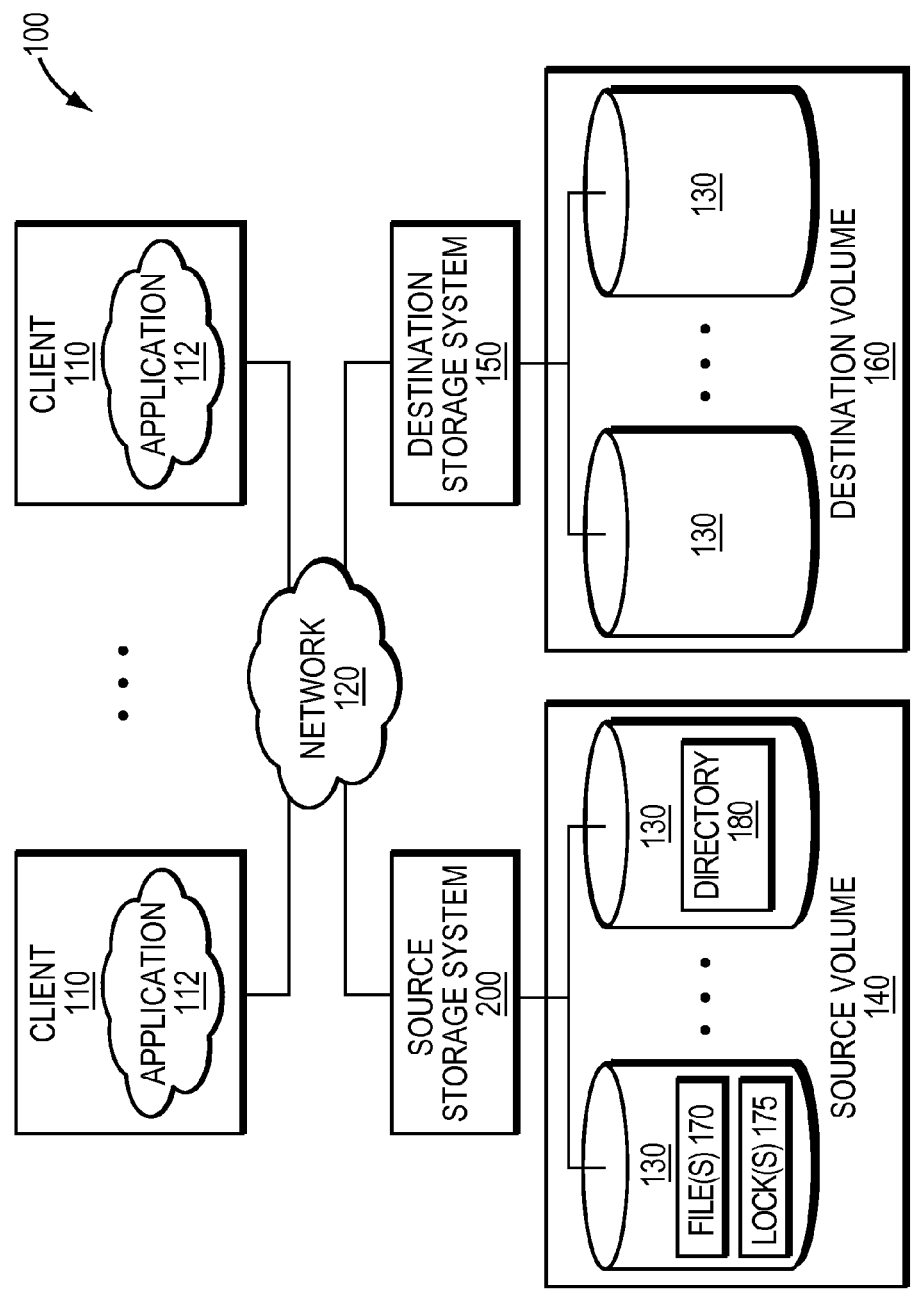
FIG. 1 is a schematic block diagram of a storage system environment that may be advantageously used with the present invention.

FIG. 1 is a schematic block diagram of a storage system environment 100 that may be advantageously used with the present invention. A source storage system 200 is illustratively interconnected with a destination storage system 150 via a computer network 120, e.g., a point-to-point link, shared local area network, wide area network or virtual private network implemented over a public network, such as the well-known Internet. To that end, the source storage system 200 is illustratively a networked computer that manages storage of information on one or more source volumes 140, each comprising an array of storage devices 130 such as disks Likewise, the destination storage system 150 is a networked computer that manages the storage of information on one or more destination volumes 160, each comprising an array of storage devices 130.

In an illustrative embodiment, each storage system may be configured to operate according to a client/server model of information delivery to thereby allow many clients 110 to access information or data, such as files and directories, stored on the volume served by the system. In this model, each client 110 may comprise an application 112 executing on a computer that "connects" (i.e., via a connection) to the storage system over network 120. Each client may request the services of the storage system by issuing file system protocol messages or requests, such as the conventional Network File System (NFS) protocol requests, to the system over the connection identifying one or more files to be accessed. In response, a file system executing on the storage system services the request and returns a reply to the client. As described herein, the source storage system 200 may also interact with the destination storage system 150 in accordance with such a client/server model during data migration. That is, the source storage system may forward requests for services over a connection to the destination storage system which, after processing the requests, may return the results of the services to the source storage system.

Broadly stated, the connection is provided by a process of a transport layer, such as the Transmission Control Protocol (TCP) layer, of a protocol stack residing in the client and storage system. The TCP layer processes establish the (TCP) connection in accordance with a conventional "3-way handshake" arrangement involving the exchange of TCP message or segment data structures. The resulting TCP connection is a reliable, securable logical circuit that is generally identified by port numbers and Internet Protocol (IP) addresses of the client and storage system. The TCP protocol and establishment of a TCP connection are well-known and described in Computer Networks, 3rd Edition, particularly at pgs. 521-542.

As used herein, the term "source" can be broadly defined as a location from which data that is subject to migration travels and the term "destination" can be defined as the location to which the data travels. While a source storage system and a destination storage system, connected by a network, is a particular example of a source and destination used herein, a source and destination could be storage systems/computers linked via a direct link, or via loopback (a "networking" arrangement internal to a single computer for transmitting data between a source storage location and a destination storage location), in which case the source and the destination are the same storage system.

It will be understood to those skilled in the art that the inventive technique described herein may apply to any type of special-purpose computer (e.g., file serving or storage appliance) or general-purpose computer, including a standalone computer, embodied as a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
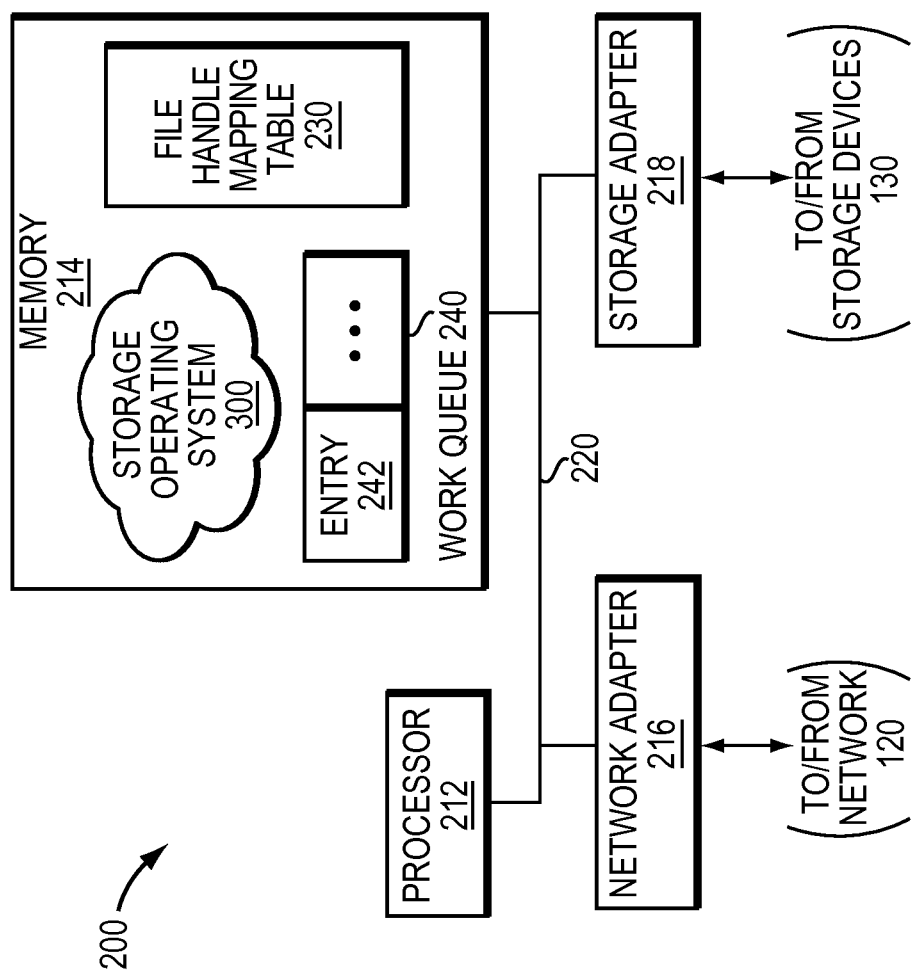
FIG. 2 is a schematic block diagram of a source storage system that may be advantageously used with the present invention.

FIG. 2 is a schematic block diagram of source storage system 200 that may be advantageously used with the present invention. For the purposes of this description, components in destination storage system (destination) 150 are generally similar to those of source storage system (source) 200 unless noted otherwise. Source 200 illustratively comprises a processor 212, a memory 214, a network adapter 216 and a storage adapter 218 interconnected by a system bus 220. The network adapter 216 comprises the mechanical, electrical and signaling circuitry needed to connect the source to each client, as well as to connect the source to the destination, to thereby facilitate communication over the network 120. The source 200 also includes a storage operating system 300 that manages data and that implements a file system to logically organize the data as a hierarchical structure of directories and files on the disks.

In an illustrative embodiment, the memory 214 comprises locations that are addressable by the processor and adapters for storing software programs and data structures associated with the embodiments described herein. The processor and adapters may, in turn, comprise processing elements and/or logic circuitry configured to execute the software programs and manipulate the data structures, such as file handle mapping table 230 and work queue 240 having one or more entries 242. It should be noted that the file handle mapping table 230 and work queue 240 are data structures utilized in connection with the present invention and, therefore, are components of the source 200 (and not the destination 150).

The storage operating system 300, portions of which are typically resident in memory 214 and executed by the processor, functionally organizes the storage system by, inter alia, invoking storage operations in support of software processes and/or services executing on the storage system. In the case of source 200 (and not destination 150), these software processes and/or services may comprise copy engine and proxy service processes of the data migration technique described further herein. It will be apparent to those skilled in the art that other processor and memory types, including various computer readable media, may be used to store and execute program instructions pertaining to the technique described herein. Also, while the description illustrates various processes, it is expressly contemplated that the various processes may be embodied as modules configured to operate in accordance with the technique herein (e.g., according to the functionality of a similar process).

The storage adapter 218 cooperates with the storage operating system 300 executing on the source to access data, e.g., as requested by the client 110. The storage adapter 218 includes input/output (I/O) interface circuitry that couples to the storage devices 130 over an I/O interconnect arrangement, such as a conventional high-performance, Fibre Channel serial link topology. The data served by the source may be stored on any type of attached array of writable storage device media, such as video tape, optical, DVD, magnetic tape, bubble memory, electronic random access memory, microelectro mechanical and any other similar media adapted to store information, including data. However, as noted herein, the data is illustratively stored on disks, such as hard disk drivers (HDD) and/or direct attached storage devices (DASD).

Storage of data on disks is preferably implemented as one or more source volumes 140 (and/or destination volumes 160) that comprise a collection of physical storage disks cooperating to define an overall logical arrangement of volume block number (vbn) space on the volume(s). The disks within a logical volume are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Figure 3:
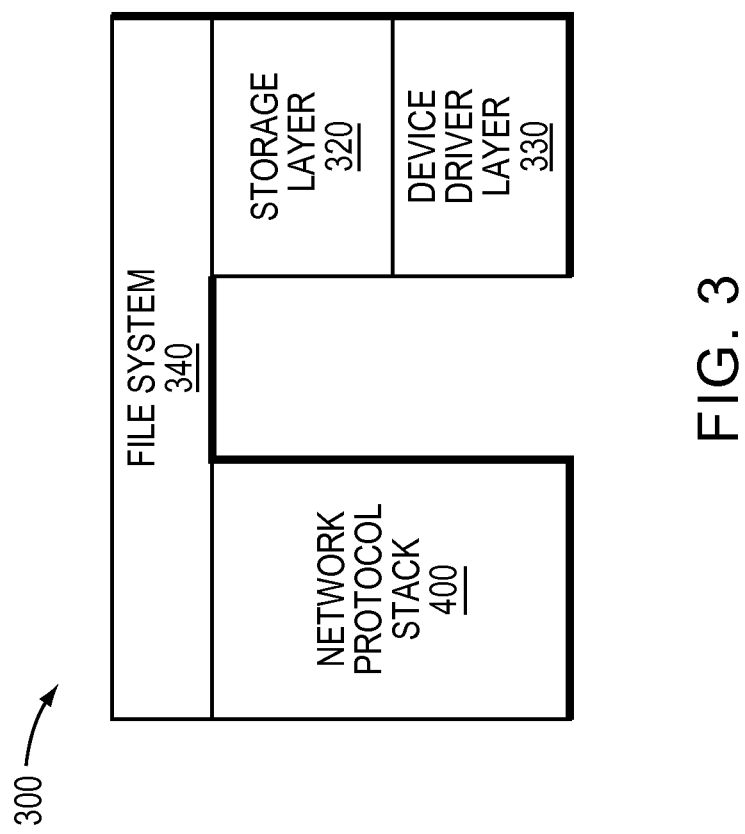
FIG. 3 is a schematic block diagram of a storage operating system that may be advantageously used with the present invention.

FIG. 3 is a schematic block diagram of the storage operating system 300 that may be advantageously used with the present invention. As used herein, the term "storage operating system" generally refers to the computer-executable code operable on a computer to perform a storage function that manages data access and may, in the case of a storage system, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described further herein.

According to one or more embodiments described herein, however, the storage operating system is preferably the NetApp® Data ONTAP™ operating system available from NetApp Inc., Sunnyvale, Calif. that implements a Write Anywhere File Layout (WAFL™) file system. Yet, it is expressly contemplated that any appropriate storage operating system may be enhanced for use in accordance with the inventive principles described herein. As such, where the term "WAFL" is employed, it should be taken broadly to refer to the file system component of any storage operating system that is otherwise adaptable to the teachings of this invention.

The storage operating system 300 comprises a series of software layers, including a network driver layer (e.g., a media access layer, such as an Ethernet driver), network protocol layers (e.g., the IP layer and its supporting transport mechanism, the TCP layer), as well as a protocol server layer (e.g., a NFS server) and a presentation layer configured to provide bindings for the transport mechanisms (e.g., a RPC/XDR layer) organized as a network protocol stack 400. In addition, the storage operating system 300 includes a storage layer 320 that implements a (disk) storage protocol, such as a RAID protocol, and a device driver layer 330 that implements a (disk) access protocol such as, e.g., a SCSI protocol.

Bridging the disk software layers with the network and protocol server layers is a virtualization system that may be abstracted through the use of a database management system, a volume manager or, as described herein, a file system 340. The file system 340 illustratively provides logical volume management capabilities for use in access to the information stored on the disks. That is, in addition to providing file system semantics, the file system 340 provides functions normally associated with a volume manager. These functions include (i) aggregation of the disks, (ii) aggregation of storage bandwidth of the disks, and (iii) reliability guarantees, such as mirroring and/or parity (RAID).

The file system 340 illustratively implements the WAFL file system having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Operationally, a request from the client 110 is forwarded as one or more packets over the computer network 120 and onto the source 200 where it is received at the network adapter 216.

A network driver of the protocol stack 400 processes the packet and, if appropriate, passes it on to a network protocol and protocol server layer for additional processing prior to forwarding to the file system 340. Here, the file system generates operations to load (retrieve) the requested data from disk if it is not resident "in core", i.e., in the memory 214. If the information is not in the memory, the file system 340 indexes into the inode file using the inode number to access an appropriate entry and retrieve a logical vbn. The file system then passes a message structure including the logical vbn to the storage layer 320; the logical vbn is mapped to a disk identifier and physical block number (disk,pbn) and sent to an appropriate driver (e.g., SCSI) of the layer 330. The driver accesses the pbn from the specified disk and loads the requested data block(s) in the memory 214 for processing by the source. Upon completion of the request, the source (and operating system) returns a reply to the client 110 over the network 120.

It should be noted that the software "path" through the storage operating system layers described above needed to perform data storage access for the access request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by the storage system in response to, e.g., a request issued by client 110. Moreover, in another alternate embodiment of the invention, the processing elements of adapters may be configured to offload some or all of the packet processing and storage access operations, respectively, from processor 212, to thereby increase the performance of the storage service provided by the system. It is expressly contemplated that the various processes, architectures and procedures described herein can be implemented in hardware, firmware or software.

As noted, a storage administrator may be required to migrate data from a local storage location in, e.g., source 200 to a remote storage location in destination 150. The storage administrator may further require a capability to migrate a subset of data in volume 140, e.g., a file 170 or a directory 180, along with any associated locks 175, without impacting client access to the data during the migration. Known data migration implementations either interrupt an application 112 running on a client 110 in order to update symbolic links or automount maps that reference a new storage location of the migrated data or introduce an additional point of failure as a result of interfacing an external storage appliance with the source storage system.

Data Migration Technique

Figure 4:
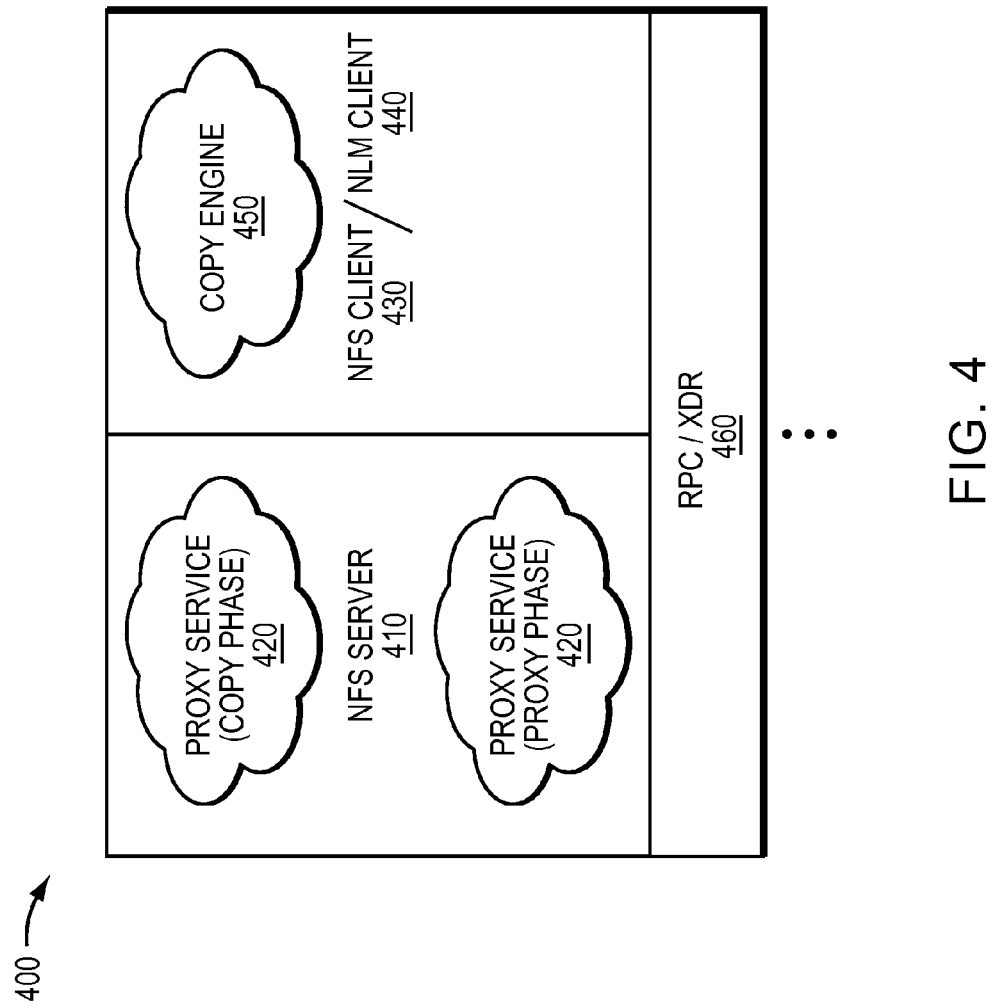
FIG. 4 is a schematic block diagram of a copy engine and proxy service of a data migration technique of the present invention.

According to one or more embodiments herein, therefore, a data migration technique is described to enable the source storage system to efficiently and reliably migrate data to the destination storage system. The data migration technique includes a copy engine and a proxy service that interact to provide transparent data migration in a storage system environment. FIG. 4 is a schematic block diagram of the copy engine 450 and the proxy service 420 of the data migration technique of the present invention. In the illustrative embodiments described herein, copy engine 450 and proxy service 420 are components of the protocol stack 400 of source storage system 200 (and not destination storage system 150).

Specifically, the source storage system 200 includes copy engine 450 configured to migrate or copy a set of data, e.g., one or more files 170, to the destination storage system 150 using a file-based protocol over network 120. The copy engine 450 is also configured to ensure that any locks 175 associated with the migrated data set are reclaimed at the destination storage system using a lock-based protocol. The source 200 further includes proxy service 420 configured to translate client requests to access the migrated data set to access requests executable (i.e., discernable) by the destination storage system 150. The proxy service 420 then forwards or proxies the translated requests over the network 120 to the destination storage system for processing. In essence, the proxy service 420 interacts with the copy engine 450 to proxy protocol specific requests and replies between a client 110 and the destination storage system 150 during copying of the migrated data set, thus rendering data migration transparent to the client.

In an illustrative embodiment, replies returned to the client 110 from the source storage system (source 200) are correlated to requests/responses with the destination storage system (destination 150) using conventional Remote Procedure Call/External Data Representation (RPC/XDR) mechanisms. Specifically, migration (copy/proxy) requests forwarded from the source to the destination are XDR-encoded, NFS RPC packets. Illustratively, correlation between the source and destination may include the source changing information within an existing RPC packet received from the client application 112 and forwarding the changed RPC packet to the destination. The information changed on the RPC portion of the packet may include the transaction identifier (XID), particularly to avoid duplicate caching issues on the destination. This is because, in an illustrative embodiment, multiple requests are multiplexed over fewer TCP connections between the source and destination than there are TCP connections between the client and source.

Figure 5:
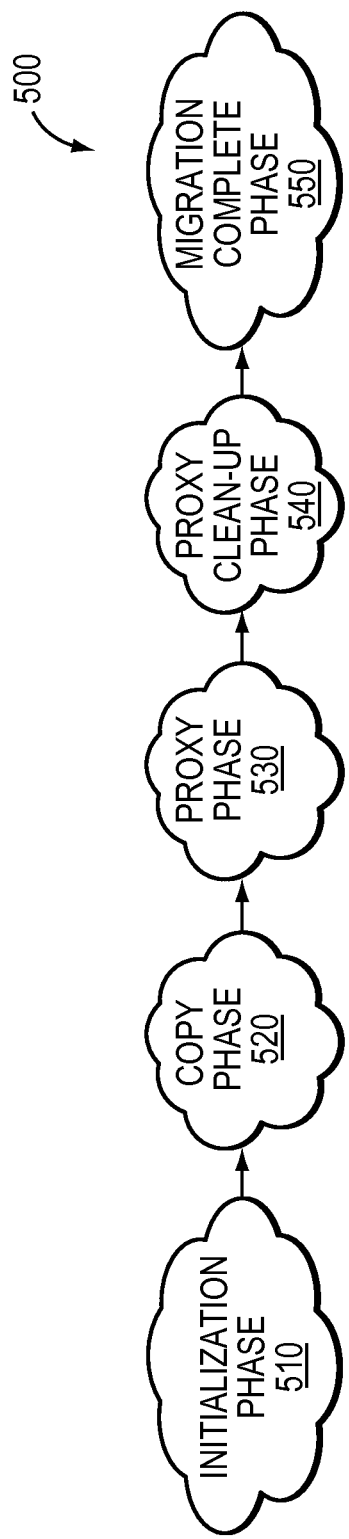
FIG. 5 is a simplified state diagram illustrating various states or phases of the data migration technique of the present invention.

FIG. 5 is a simplified state diagram illustrating various states or phases 500 of the data migration technique of the present invention. According to one or more embodiments described herein, data migration transitions through the following phases: an initialization phase 510, a copy phase 520, a proxy phase 530, a proxy cleanup phase 540 and a migration complete phase 550. In the initialization phase 510, data migration is initiated by the storage administrator entering a migrate start (e.g., treemigrate) command on, e.g., a command line interface (not shown) of the source 200. The migrate start command validates various parameters on the source, allocates memory and validates parameters on the destination. For example, the storage administrator identifies the set of data to be migrated by specifying, e.g., a file name or path to the data on the source, as well as on the destination, using the migrate start command. The source and destination path can be anywhere inside volume 140, 160. If a file name is specified, then only that file is migrated. The storage administrator also ensures that there is sufficient storage space for the migrated data set on the destination volume 160. The migration technique then transitions to the copy phase after initialization has completed.

In the copy phase 520, a set of data (e.g., one or more files 170) is migrated or copied from the source 200 to the destination 150. If a reference to a file 170 (by way of, e.g., a symbolic link) is a path outside the migrated data set, then the use of that symbolic link by a client 110, through the source, may be operational during the copy phase 520, as well as during the proxy phase 530. Use of the symbolic link by the client through the destination may or may not be operational during the proxy phase or after the migration complete phase 550, depending on whether the path is valid on the destination. Any file locks 175 on the migrated data set are recreated from the source to the destination, as described further herein.

During the copy phase, the clients 110 may continue to access (modify) the migrated data set on the source 200, although that data is not accessible through the destination 150. Modifications to the migrated data set may include the addition or removal of files 170 and directories 180. The copy engine 450 is configured to detect modifications to files 170 that are being copied or have been copied from the source to the destination. Illustratively, a proxy NFS modification request routine is invoked to ensure that every access request packet is inspected by the proxy service 420 after it has been processed by the NFS server. Any access request that is sent to the destination to maintain data consistency with the source during the copy phase is sent over a TCP connection to the NFS server on the destination.

According to one or more embodiments described herein, there are various times during the copy phase 520 where access requests to modify a file 170 in the migrated data set may occur:

Modification Before the File has been Copied.

Modifications to the file 170 on the source 200 before the file has been copied to the destination 150 are copied over when the modified file on the source is copied to the destination.

Modification while the File is being Copied.

For modifications that occur while the file 170 is being copied, the copy engine 450 looks up a source file handle of the file in the file handle mapping table 230. If there is no corresponding destination file handle (i.e., the entry is empty), the copy engine 450 may detect that copying of the file has started but that the copy has not yet completed. The modification information may therefore be loaded into a copy entry structure (entry 242) of the work queue 240.

Modification after the File has been Copied.

The copy engine 450 may forward access requests that modify files that have already been migrated to the destination using a plurality of approaches. First, the copy engine may look up the source file handles in the file handle mapping table 230 and may retrieve the corresponding destination file handles. The copy engine 450 may then generate translated access requests that include the translated file handles and send those requests to the destination 150. When replies from the destination are received, the copy engine 450 determines whether the desired processing succeeded and, if so, returns replies to the clients 110. Second, one or more entries 242 may be allocated for the work queue 240 and copy requests may be loaded into the entries so that the copy engine can copy the modifications over to the destination. It will be understood to those skilled in the art that a combination of the approaches may also be utilized in accordance with one or more embodiments described herein.

The migration technique transitions to the proxy phase once copying of the migrated data set has successfully completed. Upon entering the proxy phase 530, the source 200 relinquishes ("cuts over") servicing of access requests for the migrated data set to the destination 150. All source file handles are translated ("forwarded mapped") by the source to destination file handles for requests and, conversely, retranslated ("reverse mapped") by the source for replies. Illustratively, the cut over is enabled by the proxy service 420 on the source 200 passing client access requests directed to the migrated data set to the destination. The destination 150 sends a reply to the source, which then replies to the client 110.

During the proxy phase 530, the proxy service maps (translates) information in the access request issued by the client that is specific to the source to information that is discernable by the destination 150. Similarly, when the destination sends a reply to the source, the proxy service (re)translates information in the reply that is specific to the destination to information that is discernable to the source. Such translation renders the data migration technique and, in particular client access to the migrated data set, transparent because, to the client, it appears that the access request is processed on the source. The file handle mapping table 230 holds the translation of information from the source to the destination and from the destination to the source.

The migration technique remains in the proxy phase as long as access requests for the migrated data set are received at the source. The technique transitions from the proxy phase to the proxy cleanup phase 540 if the proxy service 420 has not proxied a request after a specified amount of time, e.g., a number of minutes, and there are no locks associated with the migrated data set still being held on the destination. The amount of time is illustratively specified as an option, e.g., a proxy inactivity timeout option, within the migration start command. In the proxy cleanup phase 540, the source 200 stops proxying requests for the migrated data set to the destination 150. The migration technique then transitions from the proxy cleanup phase 540 to the migration complete phase 550, where the migration technique completes.

Copy Engine

According to one or more embodiments described herein, the copy engine 450 copies data (e.g., files 170) from a source volume 140 on the source 200 to a destination volume 160 on the destination 150 using a file-based protocol that allows file operations over the network 120. Illustratively, implementation of the copy engine provides functionality independent of the protocol used to perform the data copy to the destination. Referring again to FIG. 4, the copy engine 450 is illustratively embodied as NFS client 430 of the protocol stack 400 executing on the source 200. The NFS client 430 is illustratively disposed over (layered on top of) RPC/XDR 460, so that NFS copy requests transmitted by the source are XDR-encoded and sent to the destination using an asynchronous RPC interface. The NFS client 430 retrieves or reads data from the file system 340 on the source 200 and writes or copies that data to the destination 150 using the file-based protocol, e.g., the NFS protocol. Note that as an NFS client, the copy engine 450 does not receive or accept access requests from the client application 112.

More specifically, the copy engine 450 is embodied as a multi-threaded process/module that employs a plurality (i.e., a pool) of worker threads that may be assigned to process items of work loaded onto queue entries 242 of the work queue 240. When loaded onto the queue entry 242, an item of work is tagged (e.g., with a command) to indicate the desired processing. Any thread in the pool may be selected to process any entry 242 from the queue 240. A worker thread is illustratively invoked (awakened) when an entry is added to the queue. The thread examines the command associated with the queue entry 242 to determine whether the desired processing involves, e.g, "walking a tree" (i.e., processing a directory 180) or copying a file 170 to the destination 150. If processing of a directory 180 is desired, then for each file 170 in the directory, a copy entry 242 is added to the queue 240.

Each worker thread may process a directory 180 in accordance with an illustrative tree walk algorithm. According to one or more embodiments described herein, the tree walk algorithm is a multi-threaded, non-recursive, breadth-first-walk algorithm. To initiate the tree walk, a source path is added to a queue entry 242 to enable creation of a corresponding path on the destination. If the source path is a directory, then the entry is added to the queue 240 after the corresponding directory is created on the destination. The worker thread may also initiate copying of the data to the destination, process a reply from the copy, or wait for work.

In an illustrative embodiment described herein, a priority algorithm/policy is used to manage the queue 240. Specifically, a queue entry 242 may be assigned a priority level (e.g., fast, medium or slow) to satisfy a quality of service feature of the data migration technique. A queue entry with an assigned priority level appears in the queue ahead of all lower-priority entries (i.e., entries with a higher priority numbers). A fairness algorithm is illustratively employed to ensure that lower priority entries/threads are not subject to starvation.

According to one or more embodiments described herein, the copy engine 450 is also illustratively embodied as a network lock manager (NLM) client 440 of the protocol stack 400 of storage operating system 300 executing on the source 200. The NLM client 440 illustratively includes a lock manager configured to determine whether there are any outstanding locks 175 associated with the migrated data set by, e.g., reading the state of the locks from a data structure of the file system 340 on the source 200. If there are outstanding locks, the NLM client 440 initiates recreation of those locks 175 on the destination 150 using the lock-based protocol, e.g., the NLM protocol. The NLM protocol is a stateful protocol used by the NLM client 440 to ensure that clients 110 recreate their locks by reclaiming them on the destination 150.

Illustratively, the NLM client 440 assumes a "lazy" approach to lock reclamation that exploits a feature of the NLM protocol that notifies all clients 110 that have outstanding locks 175 on data, such as files 170, to reclaim those locks in response to, e.g., a reboot operation. As files in the migrated data set are being copied, information is recorded for client applications 112 that hold locks on the files. Once copying of files has completed, i.e., upon transitioning from copy phase 520 to proxy phase 530, the NLM client 440 simulates a reboot of the source 200 by sending lock reclaim messages to all client applications 112 with outstanding locks using the NLM protocol. Lock reclamation occurs at the transition to the proxy phase 530 so that when the client applications 112 respond to the reclaim messages (by, e.g., sending NLM response messages requesting locks on their files), the locks are reclaimed (i.e., recreated) for the files by, e.g., recording the lock state in a data structure of the file system on the destination 150. The lock reclaim responses returned by the client applications 112 are thus illustratively proxied from the source to the destination.

Proxy Service

According to one or more embodiments described herein, the proxy service 420 may be embodied as one or more processes/modules executing within the NFS server 410 on the source 200. The proxy service 420 functionality is illustratively dependent upon a phase of execution of the migration technique, i.e., the copy phase 520 or proxy phase 530. For example, assume a client application 112 issues an access request to modify a file 170 within the migrated data set. The access request is received at the NFS server 410 of the protocol stack 400 and forwarded to the file system 340 on the source 200 for processing. The file system 340 thereafter returns a result to the NFS server 410, which creates a reply for the client. The proxy service 420 then examines the reply to determine whether the modified file was part of migrated data set and, if so, whether the file 170 was already migrated to the destination 150.

If the file was already migrated to the destination, then the proxy service 420 is in the proxy phase 530 and the access request is forwarded to the destination 150 so that the destination file system (not shown) on the destination 150 can process the modification for the migrated file. Illustratively, the file handle mapping table 230 on the source 200 is employed by the proxy service 420 because the access request includes an original file handle of the migrated file; however, the original file handle is not guaranteed to be the same on both the source and destination. For example, a volume or file system identifier (fsid) of the file handle on the source is typically different than on the destination. Thus, when an access request is received at the source 200, the original file handle identifying the file on the source is mapped or translated to a translated file handle identifying the file on the destination 150. The proxy service 420 generates a translated access request with the translated file handle that is discernable by the destination.

The proxy service 420 then forwards or proxies the translated request over the network 120 to the destination NFS server (not shown) on the destination 150, which processes the request. Upon receiving a reply from the destination, the proxy service 420 on the source 200 uses the file handle mapping table 230 to perform a reverse mapping (re-translation) of the translated file handle to the original file handle. The source then sends a reply including the original file handle to the client application 112. Thus, the migration process is transparent to the client 110, i.e., the client application 112 continues to use its original file handle to access its file 170.

If the file has not been migrated to the destination, then the proxy service 420 is in the copy phase 520. During the copy phase, the proxy service 420 keeps data consistent by enabling processing of modifications to the data. That is since the file 170 has not yet been migrated, the proxy service 420 essentially ignores the access request by, e.g., enabling the modification request to be processed by the file system 340 on the source 200 before the file is migrated to the destination 150. As a result, the modification request is passed through the NFS server 410 on the source 200 to the file system 340, which processes the request. Subsequently, when the file 170 is migrated to the destination 150, the migrated data reflects the modification.

If the modification request is directed to a file 170 that is in the process of being migrated, the proxy service 420 determines whether the portion of the file affected by the modification has already been migrated by, e.g., checking an offset of the file specified in the request. If the modification is directed to the portion of the file that has been migrated, the proxy service forwards (proxies) the modification request to the destination for processing. If the modification is directed to the portion of the file that has not yet been migrated, the modification request is ignored until read from the file system 340 after processing and then migrated to the destination. If the modification is within the range/offset currently being migrated, the proxy service 420 "rewinds" and resets its copy offset to the beginning of the range. The proxy service then retrieves the affected portion from the file system after processing, and sends the processed portion of the file to the destination 150.

Figure 6:
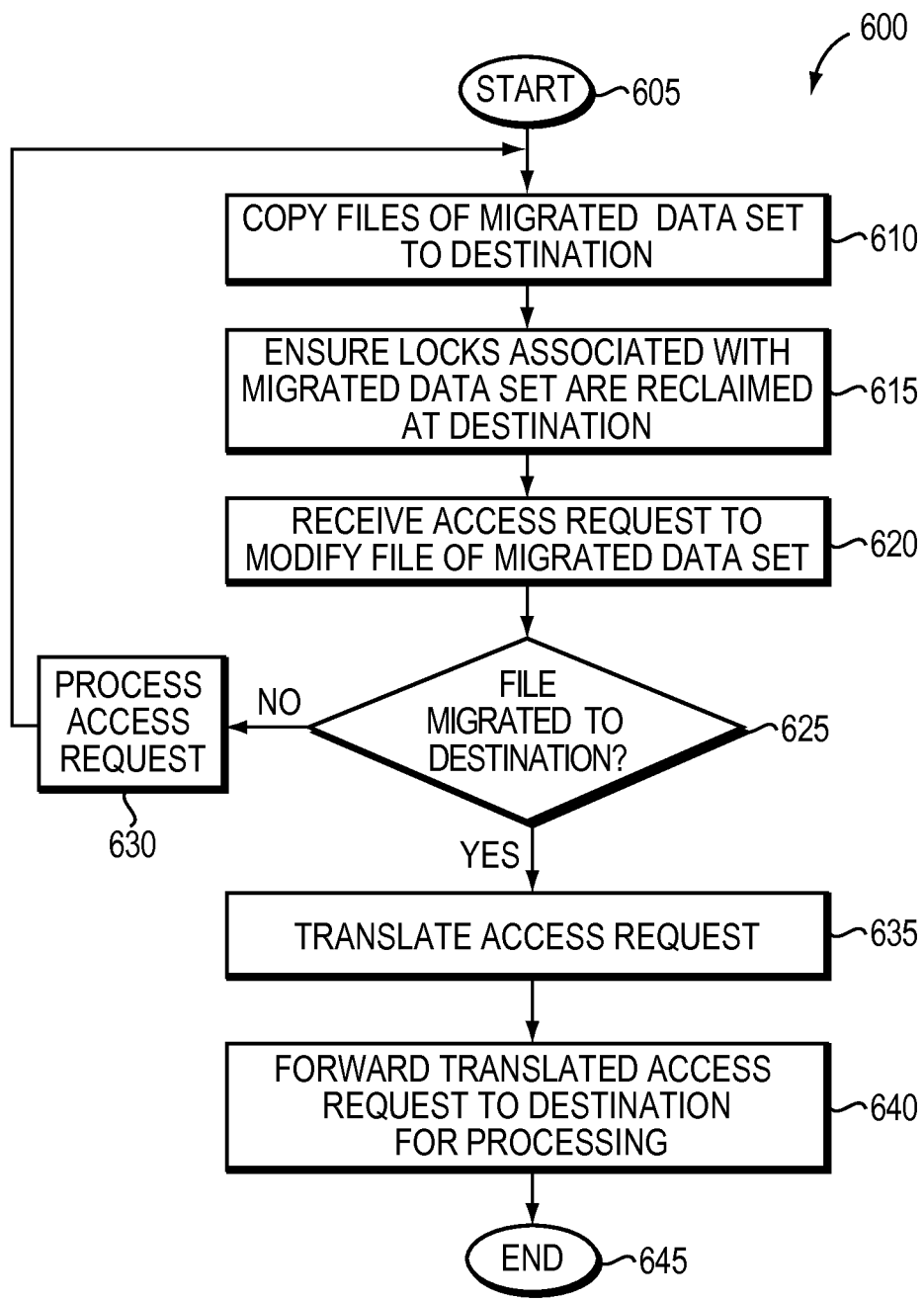
FIG. 6 illustrates a simplified procedure for enabling the source storage system to efficiently and reliably migrate data to the destination storage system in accordance with the data migration technique of the present invention.

FIG. 6 illustrates an example simplified procedure for enabling the source to efficiently and reliably migrate data to the destination in accordance with the data migration technique of the present invention. The procedure 600 starts at step 605 and continues to step 610 where the copy engine of the source copies a set of data, e.g., one or more files, to the destination using a file-based protocol over the network. In step 615, the copy engine also ensures that any locks associated with the migrated data set are reclaimed at the destination using a lock-based protocol. In step 620, the source receives an access request, issued by a client application, to modify a file of the migrated data set and, in step 625, the proxy service determines whether the file has been migrated to the destination. If not, in step 630, the file system on the source processes the request and the procedure returns to step 610. If the file has been migrated to the destination, in step 635, the proxy service translates the access request to a translated access request discernable by the destination and, in step 640, forwards the translated access request to the destination for processing. The process then ends at step 645.

Advantageously, the copy engine and proxy service cooperate to provide an integrated technique for data migration that obviates the need to interface an external appliance to the source storage system, thereby eliminating an additional point of failure. The novel technique also enables migration of data at a sub-volume level, while allowing an application running on a client to modify the data during migration in a manner that is transparent to the client.

In addition, the migration technique allows for efficient restart in the event of an interruption to the migration process due to, e.g., power loss of the source storage system. Here, data migration may be restarted upon reboot of the source. According to one or more embodiments described herein, migration restart depends upon the extent to which the data migration had progressed when the interruption occurred and, more specifically, when the source reboots. For example, if the migration is in the copy phase when the source reboots, then data migration restarts from the beginning of the process, i.e., at the initialization phase. However, if migration is in the proxy phase when the source reboots, then data migration restarts in the proxy phase. Information pertaining to the state of the migration, i.e., the "migration state", is stored on a disk of the source and includes identification of, e.g., the data set being migrated, the source and destination volumes, and the phase to which the migration had progressed. For migrations that restart in the proxy phase, the migration state also includes the contents of the file handle mapping table.

While there have been shown and described illustrative embodiments that enable migration of data in a storage system environment while allowing client access, including modification, to the data during and after the migration, it is to be understood that various other adaptations and modifications may be made within the spirit and scope of the embodiments herein. For example, the embodiments have been shown and described herein with relation to a data set, e.g., one or more files, existing on the source and migrated to the destination. However, the embodiments in their broader sense are not so limited, and may, in fact, be used with newly created files of the migrated data set.

For example, assume a new file of the migrated data set is created on the destination 150. According to one or more embodiments described herein, the new file may be created on the destination in at least two ways. A first client application 112 of a first client 110 that has mounted the destination in order to access its data may request creation of the new file during migration. The request to create the new file is received at the source 200 and proxied to the destination 150. Upon creation of the file, the destination 150 sends an acknowledgement reply to the source, which then returns the reply to the first client 110. Therefore, the file is created on the destination as a result of a proxied request and the new file appears in the namespace exported to the first client.

Alternatively, a second client application 112 that also has the destination mounted may request creation of the new file on the destination, which may further organize that file within the migrated data set. The first client application may become aware of this new file as a result of issuing, for example, a directory listing request to the source 200, which is proxied to the destination 150. The new file should appear in the namespace of the first client application; however, since the new file is created on the destination, there is no guarantee that the destination file handle identifying the file on the destination is the same as the source file handle identifying the file on the source. Accordingly, a "synthetic" file handle is illustratively created for the new file by the proxy service 420 on the source to enable the first client to view and access the file on the destination. The synthetic file handle illustratively contains sufficient information to enable mapping to the destination file handle; therefore, the synthetic file handle does not need to be stored in the file handle mapping table 240.

Assume the first client application transmits a request to the source to access the new file as part of the migrated data set. The source receives and proxies the request to the destination. When the destination replies to the source, the reply includes a file handle for the new file that is not in the file handle mapping table 230 (there is no mapping); this may signify that a new file was created on the destination. In response, the proxy service 420 on the source 200 may create a synthetic file handle that is included in the reply returned to the first client application 112.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    copying a migrated data set from a source system to a destination system using a first protocol over a network interconnecting the source system and the destination system;
    ensuring that locks associated with the migrated data set at the source system are reclaimed at the destination system using a second protocol;
    receiving, at the source system, an access request directed to modifying selected data of the migrated data set;
    determining, by a processor, whether the selected data has been migrated to the destination system;
    in response to determining that the selected data has not been migrated to the destination system, executing the access request at the source system; and
    in response to determining that the selected data has been migrated to the destination system, translating, at the source system, the access request to a translated access request discernible by the destination system and forwarding the translated access request to the destination system for processing.

2. The method of claim 1 wherein the selected data comprises a file and wherein the first protocol allows file operations over the network.

3. The method of claim 2 wherein the second protocol is a lock based protocol and wherein ensuring comprises:
    notifying a client having a lock on the file to reclaim the lock using the lock based protocol.

4. The method of claim 2 wherein the access request includes an original file handle of the file and wherein translating comprises:
    employing a file handle mapping table to translate the original file handle identifying the file on the source system to a translated file handle identifying the file on the destination system.

5. The method of claim 4 further comprising:
    receiving a reply at the source system from the destination system;
    using the file handle mapping table of the source system to retranslate the translated file handle to the original file handle; and
    sending a reply including the original file handle from the source system to a client.

6. A system comprising:
    a network interface connected to a network, the network interface adapted to receive an access request to modify selected data of a migrated data set issued by a client over the network;
    a processor coupled to the network interface and adapted to execute a copy engine process and a proxy service process; and
    a memory adapted to store the copy engine process executable by the processor, the copy engine process when executed operable to:
        copy the migrated data set to a destination storage system connected to the network using a first protocol; and
        ensure that locks associated with the migrated data set are reclaimed at the destination storage system using a second protocol; and
    the memory further adapted to store the proxy service process executable by the processor, the proxy service process when executed operable to:
        determine if the selected data of the migrated data set has been migrated to the destination storage system;
        process the access request associated with the selected data at the system, in response to determining that the selected data has not been migrated to the destination storage system; and
        translate the access request to a translated access request discernible by the destination storage system and forward the translated access request over the network to the destination storage system for processing, in response to determining that the selected data has been migrated to the destination storage system.

7. The system of claim 6 wherein the memory is further adapted to store a work queue and wherein the copy engine process is a multi-threaded process that employs a plurality of threads to process one or more items of work loaded onto one or more entries of the work queue.

8. The system of claim 7 wherein the migrated data set comprises one or more files and directories, and wherein a thread is adapted to process a directory or copy a file to the destination storage system.

9. The system of claim 8 wherein if the thread processes the directory, an entry is added to the work queue for each file in the directory.

10. The system of claim 7 wherein a priority algorithm is used to manage the work queue by assigning a priority level to each entry of the queue.

11. The system of claim 10 wherein a fairness algorithm is further used to ensure that lower priority level entries are not subject to starvation.

12. The system of claim 6 wherein the first protocol is a network file system (NFS) protocol and wherein the copy engine process is embodied as a NFS client of a protocol stack executing on the system.

13. The system of claim 12 wherein the NFS client is configured to retrieve data of the migrated data set from a file system executing on the system and write the data to the destination storage system using the NFS protocol.

14. The system of claim 12 wherein the second protocol is a network lock manager (NLM) protocol and wherein the copy engine process is also embodied as a NLM client of the protocol stack.

15. The system of claim 14 wherein the NLM client ensures that the locks associated with the migrated data set are reclaimed by sending lock reclaim messages to clients of the locks using the NLM protocol.

16. The system of claim 6 wherein the selected data comprises a file and wherein the access request includes an original file handle of the file.

17. The system of claim 16 wherein the memory is further adapted to store a file handle mapping table configured to translate the original file handle identifying the file on the system to a translated file handle identifying the file on the destination storage system.

18. The system of claim 6 wherein the migrated data set includes a new file created on the destination storage system and wherein the proxy service process when executed is operable to create a synthetic file handle for the new file, the synthetic file handle enabling the client to view and access the new file on the destination storage system.

19. The system of claim 18 wherein the synthetic file handle contains information to enable mapping to a destination file handle used to identify the new file on the destination storage system.

20. A non-transitory computer readable media containing instructions for execution on a processor comprising:
 copying a migrated data set from a source storage system to a destination storage system using a protocol that allows file operations over a network interconnecting the storage systems;
 ensuring that locks associated with the migrated data set at the source storage system are reclaimed at the destination storage system using a lock-based protocol;
 receiving an access request issued by a client to modify a file of the migrated data set at the source storage system;
 determining whether the file has been migrated to the destination storage system;
 if the file has not been migrated to the destination storage system, processing the access request at the source storage system prior to copying the file to the destination storage system; and
 if the file has been migrated to the destination storage system, translating the access request to a translated access request executable by the destination storage system and forwarding the translated access request from the source storage system over the network to the destination storage system for processing.

21. The non-transitory computer readable media of claim 20 further comprising:
 restarting migration of the migrated data set upon an interruption at the source storage system, wherein a phase at which the migration restarts depends upon an extent to which the migration had progressed when the interruption occurred.

\* \* \* \* \*